(12) United States Patent
Sato

(10) Patent No.: US 7,580,057 B2
(45) Date of Patent: Aug. 25, 2009

(54) VEHICULAR IMAGE PICKUP DEVICE

(75) Inventor: Yasuhiro Sato, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 585 days.

(21) Appl. No.: 11/304,806

(22) Filed: Dec. 16, 2005

(65) Prior Publication Data

US 2006/0132603 A1 Jun. 22, 2006

(30) Foreign Application Priority Data

Dec. 17, 2004 (JP) .................... 2004-366637

(51) Int. Cl.
H04N 5/225 (2006.01)
H04N 9/47 (2006.01)
H04N 7/18 (2006.01)
H04N 7/00 (2006.01)

(52) U.S. Cl. .............. 348/207.99; 348/95; 348/148; 348/118

(58) Field of Classification Search .......... 348/118, 348/120, 148, 80, 81, 86, 92, 94, 95, 100, 348/108, 116, 119, 207.99; 396/12, 419, 396/422, 424, 426–482; 344/144; 340/937; 356/138, 139.06, 139.09, 150, 153–155

See application file for complete search history.

(56) References Cited

U.S. PATENT DOCUMENTS

| | | | | |
|---|---|---|---|---|
| 3,498,722 A | * | 3/1970 | Levin | 356/138 |
| 4,949,186 A | * | 8/1990 | Peterson | 386/107 |
| 5,111,289 A | * | 5/1992 | Lucas et al. | 348/148 |
| 5,477,268 A | * | 12/1995 | Shimbara et al. | 348/128 |
| RE37,709 E | * | 5/2002 | Dukek | 348/148 |
| 6,819,231 B2 | * | 11/2004 | Berberich et al. | 340/435 |

FOREIGN PATENT DOCUMENTS

JP  11-078717  3/1999

* cited by examiner

*Primary Examiner*—Tuan V Ho
*Assistant Examiner*—Euel K Cowan
(74) *Attorney, Agent, or Firm*—Rader, Fishman & Grauer PLLC; Ronald P. Kananen

(57) ABSTRACT

A position adjustment of the camera body 2 to a reference position can be performed by the position adjustment mechanism 4 with reference to a position relation between the mark 5 provided in the bottom portion 2a of the camera body 2 and the slit 6 formed in the bottom portion 3a of the bracket 3. Therefore, it is not required that the vehicular image pickup device is connected to the monitor to perform the position adjustment by confirming the pickup image of each one, thus allowing reduction of hours and labors required for reference position adjustment of the camera body 2. Further, since the vehicular image pickup device can be shipped in a state where the camera body 2 is still adjusted to the reference position, hours and labors required for the reference position adjustment of the camera body 2 after the image pickup device is mounted to the vehicle can be reduced.

4 Claims, 3 Drawing Sheets

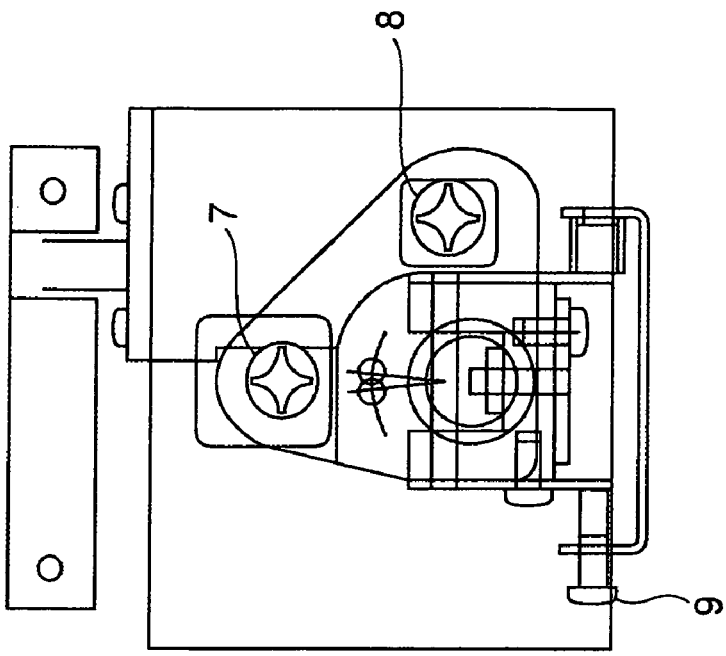
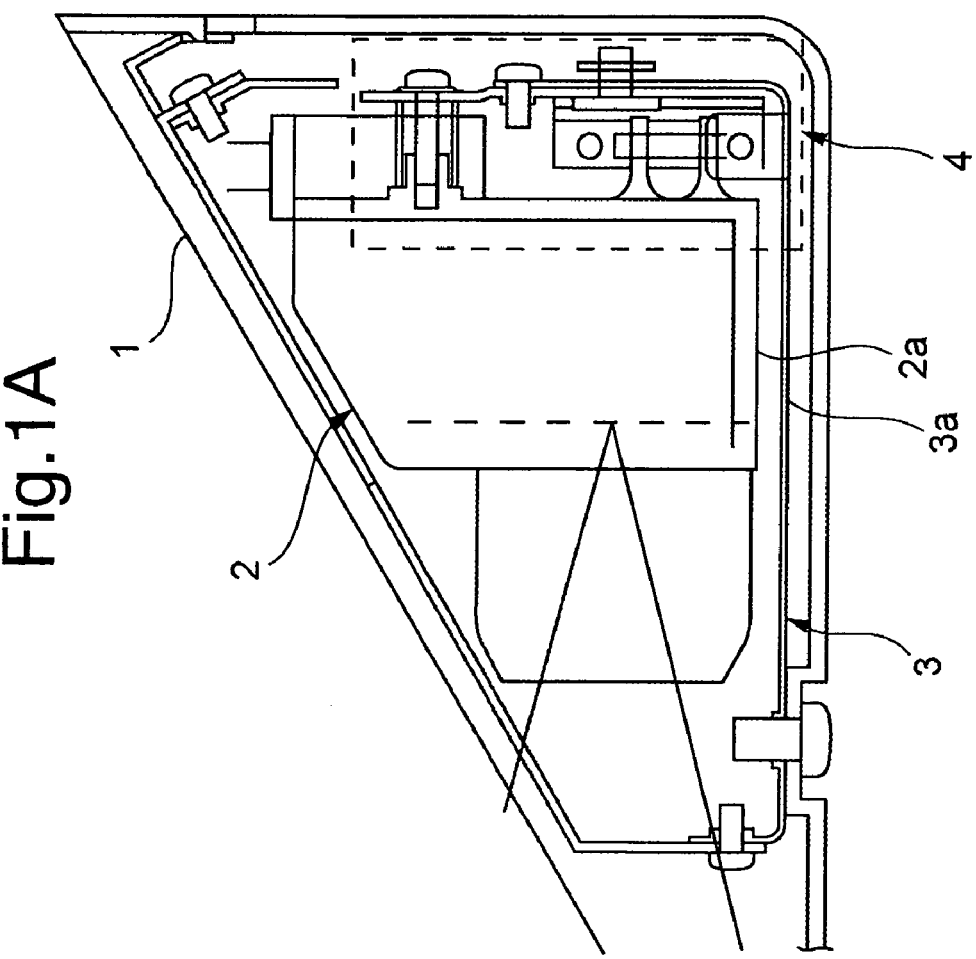

when a camera is shifted in
the upward direction when a camera is shifted in
the downward direction when a camera is shifted in the left direction when a camera is shifted in the right direction when a camera rotates in the left direction when a camera rotates in the right direction

VEHICULAR IMAGE PICKUP DEVICE

BACKGROUND OF THE INVENTION

1. Field of the Invention

The present invention relates to a vehicular image pickup device which picks up an image of an environment outside of a vehicle.

2. The Related Art of the Invention

Conventionally it is known a vehicular image pickup device mounted in a vehicle for picking up an image of an environment outside of the vehicle, in which an image pickup device body is received inside a casing and is mounted to the vehicle via the casing (for example, refer to Japanese Unexamined Patent Publication No. 11-78717). In such vehicular image pickup device, it is required to adjust the image pickup device body to a reference (neutral) position corresponding to variations in vehicles while confirming a pickup image thereof with a monitor.

SUMMARY OF THE INVENTION

According to the conventional vehicular image pickup device, however, since the vehicular image pickup device itself does not recognize the reference position of the image pickup device body, the image pickup device body can not be adjusted to the reference position with shipment.

Therefore, according to the conventional vehicular image pickup device, the image pickup device is shipped in a state where a position of the image pickup device body is not adjusted to the reference position and thereby, many hours and labors are possibly required for adjustment of the image pickup device to the reference position after it is mounted to a vehicle.

In addition, it is assumed that, in order to solve such problem, the image pickup device is shipped after the position of the image pickup device body is adjusted to the reference position. In the case of using this method, however, vehicular image pickup devices are required to be connected one by one to a monitor to confirm a pickup image of each one in a manufacturing line and therefore, many hours and labors therefor are required. Further, since this method requires readjustment of the image pickup device body position after it is mounted to the vehicle, it is not meaningful to independently adjust the position of the vehicular image pickup device.

In view of the above, there exists a need for a vehicular image pickup device which overcomes the above-mentioned problems in the related art. The present invention addresses this need in the related art as well as other needs, which will become apparent to those skilled in the art from this disclosure.

The present invention has been made for solving the foregoing problems and has an object of providing a vehicular image pickup device which is capable of reducing hours and labors required for adjusting an image pickup device body to a reference position.

A vehicular image pickup device according to the present invention, in order to solve the foregoing problems, comprises an image pickup device body to pick up an image of an environment outside of a vehicle, a receiving part which receives the image pickup device body therein and is fixed to a predetermined mounting position of the vehicle, a position adjustment mechanism which adjusts a position of the image pickup device body in the receiving part, wherein a position adjustment mark having a predetermined shape is provided in a predetermined portion of the image pickup device body and a through hole is formed in a corresponding portion of the receiving part facing the predetermined portion of the image pickup device body, the through hole having a shape through which a shift in a relative position with the position adjustment mark is recognized.

ADVANTAGES OF THE INVENTION

According to a vehicular image pickup device in the present invention, a position adjustment of the image pickup device body can be easily performed with reference to a position relation between the position adjustment mark and the through hole, thus allowing reduction of hours and labors required for reference position adjustment of the image pickup device body.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

A preferred embodiment according to the present invention will be explained below referring to the drawings, wherein:

FIG. 1A is a side cross-sectional view showing a vehicular image pickup device in a preferred embodiment of the present invention;

FIG. 1B is a rear cross-sectional view showing a vehicular image pickup device in the preferred embodiment of the present invention;

DETAILED DESCRIPTION OF THE PREFERRED EMBODIMENT

Figure 2:
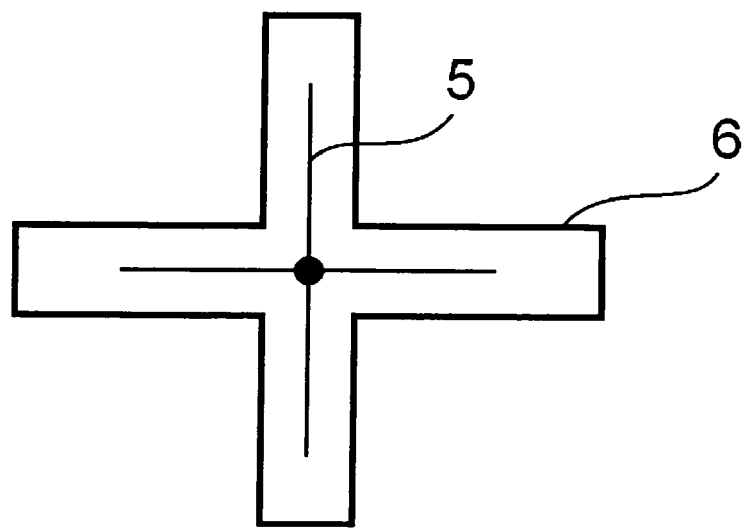
FIG. 2 is a view showing a position relation between a mark and a slit when a camera is located in a reference position.

A construction of an image pickup device in a selected preferred embodiment of the present invention will be explained below with reference to the drawings. It will be apparent to those skilled in the art from this disclosure that the following description of the preferred embodiment of the present invention is provided for illustration only, and not for the purpose of limiting the invention as defined by the appended claims and their equivalents.

Construction of Vehicular Image Pickup Device

An image pickup device in a preferred embodiment of the present invention is mounted in an inner surface side of a windshield 1 in such a position as not to block a driving operation of a driver. As shown in FIG. 1A, the vehicular image pickup device is provided with a camera body 2, a bracket 3 and a position adjustment mechanism 4 as major construction elements. The camera body 2 is formed of a known CCD (Charge Coupled Device) image pickup element to pick up an image of a travel circumference in front of a vehicle and a cross-shaped mark (position adjustment mark) 5, which is used for a reference position adjustment method described later, is provided in a bottom portion 2a of the camera body 2.

The bracket 3 receives the camera body 2 therein and is fixed to a mounting position of the vehicular image pickup device In addition, a cross-shaped slit 6, which is used for a reference position adjustment method described later, is formed in a bottom portion 3a of the bracket 3. The position adjustment mechanism 4 is disposed inside the bracket 3 and, as shown in FIG. 1B, includes an upward and downward adjustment screw 7 contacting an upper end portion of the camera body 2, a right and left adjustment screw 8 contacting a right end portion of the camera body 2 and a rotational adjustment screw 9 contacting a bottom portion of the camera body 2. Note that, as shown in FIG. 2, the mark 5 and the slit 6 are formed in a position in which the mark 5 is completely seen through the slit 6 from an outside of a vehicle when the camera body 2 is located in a reference (neutral) position. The slit 6 serves as a through hole.

With the vehicular image pickup device formed of such construction, a reference position adjustment method shown below allows the camera body 2 to be adjusted to a reference position before the vehicular image pickup device is mounted to the windshield 1, leading to easy position adjustment work after mounting the vehicular image pickup device to a vehicle. The reference position adjustment method will be hereinafter explained with reference to FIGS. 3 to 5.

Reference Position Adjustment Method

In the vehicular image pickup device, the mark 5 and the slit 6 each are formed in the bottom portions of the camera body 2 and the bracket 3 and are provided in positions in which the mark 5 is completely seen through the slit 6 from an outside of a vehicle when the camera body 2 is located in a reference (neutral) position. Accordingly, in the vehicular image pickup device, a position of the camera body 2 is adjusted by the position adjustment mechanism 4 based upon observing a position relation between the mark 5 and the slit 6, and the camera body 2 can be easily adjusted to a reference position by adjusting the position of the camera body 2 to a position where the mark 5 is completely seen through 6 from an outside of the vehicle.

Figure 3A:
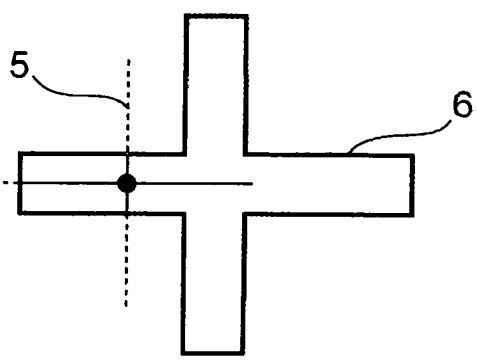
FIG. 3A is a view showing a position relation between a mark and a slit when a camera is shifted in then upward direction.
Figure 3B:
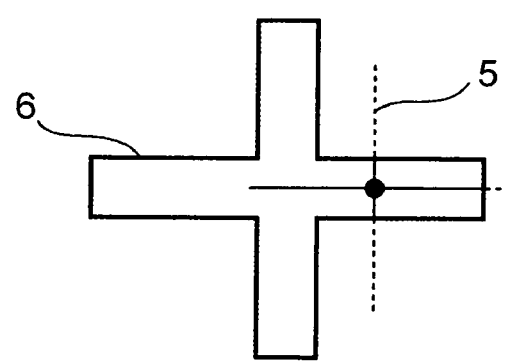
FIG. 3B is a view showing a position relation between a mark and a slit when a camera is shifted in the downward direction.

In more detail, when the camera body 2 is shifted in the upward/downward direction, the mark 5 is seen through the slit 6 as shown in FIG. 3A or FIG. 3B. Accordingly, a person for adjustment rotates the upward and downward adjustment screw 7 to move the camera body 2 in the upward/downward direction, thereby allowing the camera body 2 to be adjusted to a reference position.

Figure 4A:
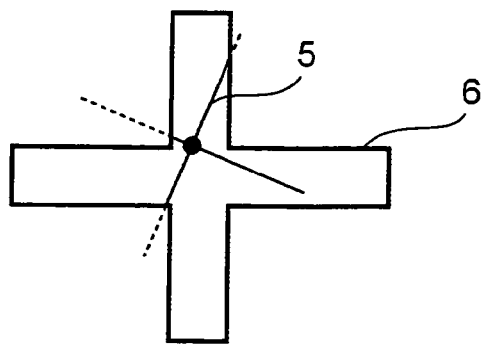
FIG. 4A is a view showing a position relation between a mark and a slit when a camera is shifted in the left direction.
Figure 4B:
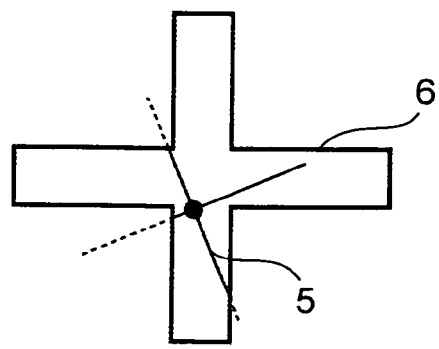
FIG. 4B is a view showing a position relation between a mark and a slit when a camera is shifted in the right direction.

Similarly, when the camera body 2 is shifted in the left/right direction, the mark 5 is seen through the slit 6 as shown in FIG. 4A or FIG. 4B. Accordingly, a person for adjustment rotates the right and left adjustment screw 8 to move the camera body 2 in the right/left direction, thereby allowing the camera body 2 to be adjusted to a reference position.

Figure 5A:
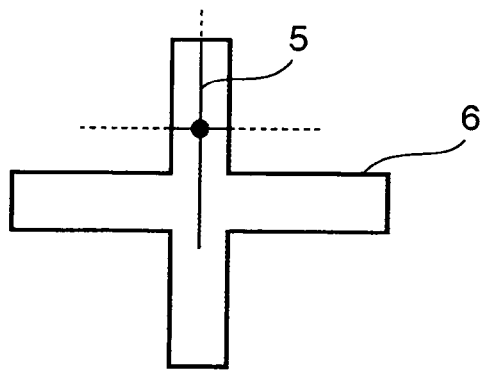
FIG. 5A is a view showing a position relation between a mark and a slit when a camera rotates in the left direction.
Figure 5B:
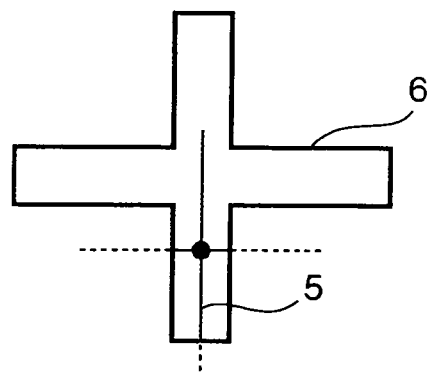
FIG. 5B is a view showing a position relation between a mark and a slit when a camera rotates in the right direction.

In addition, similarly, when the camera body 2 rotates in the left/right direction, the mark 5 is seen through the slit 6 as shown in FIG. 5A or FIG. 5B. Accordingly, a person for adjustment rotates the rotational screw 9 to rotate the camera body 2, thereby allowing the camera body 2 to be adjusted to a reference position.

As is apparent from the above explanation, According to the vehicular image pickup device in the preferred embodiment of the present invention, a position adjustment of the camera body 2 can be performed with reference to a position relation between the mark 5 and the slit 6. Therefore, it is not required that the vehicular image pickup device is connected to the monitor to perform the position adjustment by confirming the pickup image of each one, thus allowing reduction of hours and labors required for reference position adjustment of the camera body 2. Further, the vehicular image pickup device can be shipped in a state where the camera body 2 is still adjusted to the reference position, and therefore, hours and labors required for reference position adjustment of the camera body 2 can be reduced.

As described above, the preferred embodiment to which the present invention made by the present inventor is applied is explained, but the present invention is not limited by the descriptions and the drawings of the preferred embodiment which are a part of the present invention. For example, in the preferred embodiment, since the bottom portion of the camera body 2 is positioned so as to be opposed to the bottom portion of the bracket 3, the mark 5 and the slit 6 each are provided in the bottom portions of the camera body 2 and the bracket 3, but the mark 5 and the slit 6 may be disposed in surfaces other than the bottom portions, depending on the position relation between the camera body 2 and the bracket 3 as long as the camera body 2 and the bracket 3 are opposed with each other through the surfaces. In addition, in the preferred embodiment, the mark 5 and the slit 6 are formed in the same shape, but since the position adjustment of the camera body 2 can be performed if the position relation (shift) between the mark 5 and the slit 6 is recognized, the mark 5 and the slit 6 each may be formed in a different shape with each other, for example, cross-slit shape for the mark 5 and circular shape for the slit 5 or square-shaped hole for the mark 5 and circular shape for the slit 6.

This application claims priority to Japanese Patent Application No. 2004-366637. The entire disclosure of Japanese Patent Application No. 2004-366637 is hereby incorporated herein by reference.

While only the selected preferred embodiment has been chosen to illustrate the present invention, it will be apparent to those skilled in the art from this disclosure that various changes and modifications can be made therein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A vehicular image pickup device, comprising:
   an image pickup device body to pick up an image of an environment outside of a vehicle;
   a receiving part which receives the image pickup device body therein and is fixed to a predetermined mounting position of the vehicle; and
   a position adjustment mechanism which adjusts a position of the image pickup device body in the receiving part, wherein:
   a position adjustment mark having a predetermined shape is provided in a predetermined portion of the image pickup device body; and a through hole is formed in a corresponding portion of the receiving part facing the predetermined portion of the image pickup device body, the through hole having a shape through which a shift in a relative position with the position adjustment mark is recognized.

2. The vehicular image pickup device according to claim 1, wherein:

the position adjustment mechanism includes a device to adjust one directional position of the image pickup device body;

a device to adjust a directional position of the image pickup device body perpendicular to the one directional position thereof; and a device to adjust a rotational angle of the image pickup device body.

3. The vehicular image pickup device according to claim 1, wherein:

the predetermined portion of the image pickup device body is a bottom portion thereof;

the predetermined shape of the position adjustment mark is a cross shape;

the corresponding portion of the receiving part is a bottom portion thereof; and the shape of the through hole is a cross shape.

4. The vehicular image pickup device according to claim 1, wherein:

the predetermined shape of the position adjustment mark is a cross shape; and the shape of the through hole is a circular shape.

* * * * *